United States
Flogaus et al.

[11] 3,885,857
[45] May 27, 1975

[54] CONVERGENT BEAM SCANNER WITH MULTIPLE MIRROR DEFOCUS COMPENSATION

[75] Inventors: William S. Flogaus, Alexandria; Mitsumasa Masutani, Ft. Belvoir, both of Va.

[73] Assignee: The United States of America as represented by the Secretary of the Army, Washington, D.C.

[22] Filed: Oct. 23, 1973

[21] Appl. No.: 408,978

[52] U.S. Cl. .................. 350/7; 250/235; 350/285; 178/7.6
[51] Int. Cl. .............................................. G02b 17/00
[58] Field of Search .......... 350/6, 7, 285, 288, 299; 178/7.6; 250/234–236

[56] References Cited
UNITED STATES PATENTS

| | | |
|---|---|---|
| 1,136,761 | 4/1915 | Becker ..................... 350/6 |
| 2,792,448 | 5/1957 | Deuth et al. ................. 350/6 |
| 3,066,576 | 12/1962 | Clorfeine ................... 350/285 |
| 3,153,723 | 10/1964 | Weiss ....................... 350/7 |
| 3,614,194 | 10/1971 | Harris ...................... 350/7 |

OTHER PUBLICATIONS

Rutter, "Scanning Apparatus," IBM Tech. Disclosure Bulletin, Vol. 5, No. 7, 1962, p.

*Primary Examiner*—Ronald L. Wibert
*Assistant Examiner*—Michael J. Tokar
*Attorney, Agent, or Firm*—Nathan Edelberg; Robert P. Gibson; John E. Holford

[57] ABSTRACT

Defocus compensation is provided for a convergent beam scanner by using a system of flat scanning mirrors rotating about a spaced parallel common axis instead of single mirror rotating about its central axis.

6 Claims, 6 Drawing Figures

PATENTED MAY 27 1975 3,885,857

SHEET 1

3,885,857

CONVERGENT BEAM SCANNER WITH MULTIPLE MIRROR DEFOCUS COMPENSATION

The invention described herein may be manufactured, used, and licensed by or for the Government for governmental purposes without payment to us of any royalty thereon.

This application is related in principle to copending application Ser. No. 408,904 entitled "Method and Apparatus for Defocus Compensation of a Convergent Beam Scanner" by the same inventors filed on even date herewith.

BACKGROUND OF INVENTION

In the above mentioned copending application a method of compensating for defocus of a convergent beam reflecting off the surface of a rotating plane mirror is described. This was accomplished by rolling the reflecting surface over a cylindrical surface, rather than rotating the mirror about its central axis. A particular type of drive system had to be employed to supply the rocking motion for the mirror as opposed to simple rotary motors previously used. The scanner is intended for use in infrared viewing systems where infrared and visible scanned images are synchronized by reflection on from different sides of the same rotating (or vibrating) scanning mirror. With a simple rotating mirror the processing of the infrared and visible images was achieved by two separate electronic systems on opposite sides of the mirror, so that there was no problem in placement of the elements detectors and light emitting diodes utilized for the two systems. In the single sided scanner of the above mentioned copending application the axis of the infrared objective lens system and axis of the visible eyepiece lens system are parallel and spaced apart less than largest dimension of the small scan mirror. This imposes undesireable limitations on the type of lens systems employed.

SUMMARY OF INVENTION

The present invention provides a compensation system wherein a plurality of plane reflecting mirrors scan a converging or diverging beam directed on or emanating from a linear array of electro-optical elements. The mirrors are balanced around a common axis of rotation thereby permitting the use of a rotary drive motor. The infrared and visible transmitting lens elements are located near opposite ends of the common axis so that they do not interfere with one another. The axis of the lens elements and the common axis are parallel and may be common, if desired.

BRIEF DESCRIPTION OF DRAWINGS

The invention is best understood with reference to the attached drawings wherein.

DESCRIPTION OF THE INVENTION

Figure 1:
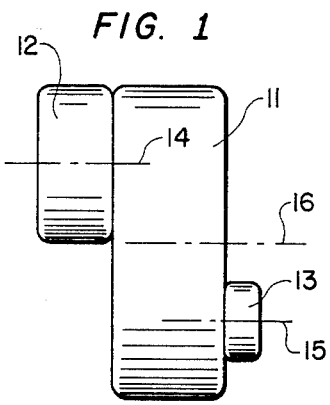
FIG. 1 shows a first embodiment of the invention having the optical axis of the objective lens and the optical axis of the eyepiece in spaced parallel relationship to the axis of the scanning mirrors.

In FIG. 1 the edge view of a generally disc-shaped viewer is shown. A housing member 11 encloses the viewer except for an objective lens 12 and an eyepiece 13 having their optical axes 14 and 15 parallel to the axis 16 of the disc-shaped housing 11, but spaced therefrom. Such an arrangement allows adequate room for the internal components.

Figure 2:
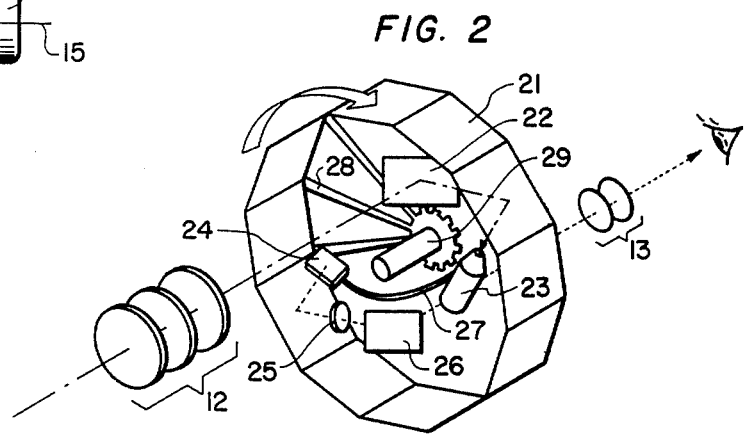
FIG. 2 shows an exploded view of the internal elements of FIG. 1.

FIG. 2 shows an exploded view of the internal components. Light energy from a distant image is gathered by the objective lens 12, which may be designed to pass far-infrared energy. A rectangular deflection mirror (or prism) 22 reflects the converging image at right angles as it reaches the approximate center of the axial dimension of the housing. Traveling parallel to the broad circular walls of the housing the beam is again reflected from a first of a plurality of plane rectangular scanning mirrors 21 having their edges connected and their adjacent plane reflecting surfaces intersecting at equal angles, so that their remaining edges form two regular polygons. The beam finally converges to form a plane image on the surface of a detector 23. The detector surface contains a linear array of electro-optical devices such as photodiodes oriented parallel to the symmetry axis of mirrors 21. A plurality of spoke members 28 extend from the corners of the mirrors to the symmetry axis of the mirrors which axis coincides with the axis 16 of the housing. At this axis the spoke members are rigidly attached to the shaft of a motor 29, the latter being coaxially attached to the housing 11 from FIG. 1. Members 12, 22 and 23 are also rigidly mounted on the same housing. The detector 23, which includes electronics for amplifying and otherwise processing its output, is coupled by leads 27 to a second linear array of electro-optical devices such as light emitting diodes (LEDs) similar in geometry to the photodiodes on the detector and in the same geometrical relationship to a second mirror, of said mirrors 21, other than the one intercepting the beam to said detector (preferably a diametrically opposite one). A rectangular mirror or prism 26 redirects the beam to the eyepiece 13. The elements are arranged so that, as the mirrors 21 rotate, the entire rectangular image reflected from mirror 22 is uniformly swept over the linear array of photodiodes and the line image produced by the LEDs sweeps out the surface of mirror 26. This is accomplished by proper choice of angular relationships, the radial distance (R) from the axis to mirrors 21 and the spacing (r) of the detector and LEDs from mirrors 21. The geometrical calculations required are easily made by those skilled in the art. The longer the spokes are made the better will be the defocus compensation of this device compared to a similar system using a plane mirror rotating about its central axis. The cross-section of the spokes presented to entering and exiting beams acts as a shutter to remove any stray radiation between scans which might appear in the system. Power for the motor and electronics can come from batteries within the housing or an external source coupled through the housing wall in the usual manner.

TABLE A

A typical system has the following parameters:
| | |
|---|---|
| F — (focal length of lens system) | 4 Inches |
| F - (f/diam of lens opening) | 2 " |
| R - (spacing of scanning mirror from axis) | 2 " |
| r - (spacing of scanning mirror from detector) | 0.86 " |
| FOV - (Field of View) | 5 × 10 |
| - θ - (half angle of scan) | 20 |
| η - (angle of incidence with scan mirror centered) | 60 |
| α - (see copending application) | 0 |
| Number of Mirrors | 12 |
| Scan Rate (20 frames/sec) | 100 rpm |

Figure 3:
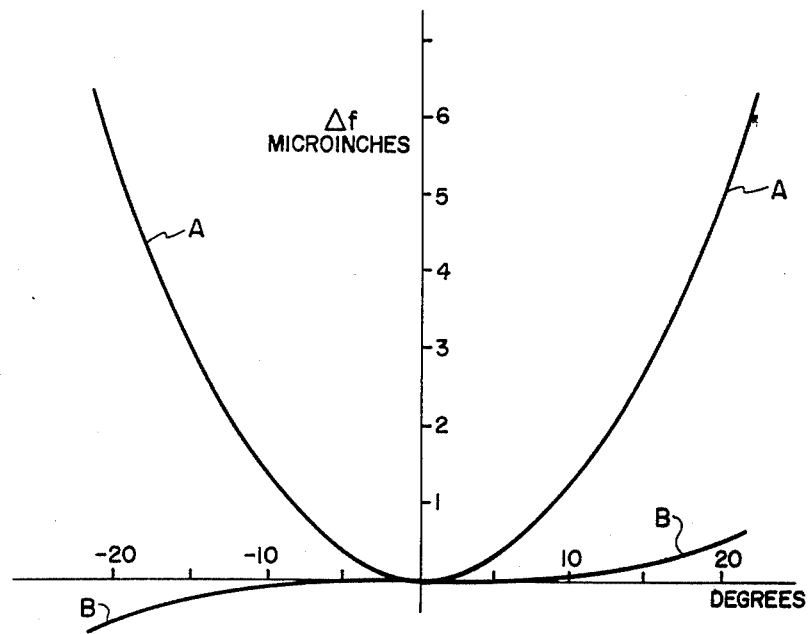
FIG. 3 shows a curve of the defocusing ($\Delta f$) as function of scan angle for the device of FIG. 1 compared to the curve for a similar system using a simple rotating mirror.

FIG. 3 shows a curve of the defocusing $\Delta f$ at the face of the detector (or the LEDs) as a function of the scan angle of mirrors 21 from the center of each scan. Curve A shows the curve obtained by a scan mirror in a similar system that is merely rotated about its central axis, while curve B shows the same values for the system of FIGS. 1 and 2. The maximum defocusing can be decreased further by slightly changing the angular relationship between the mirrors by a small angle $\alpha$ as explained in the above mentioned copending application.

Figure 4:
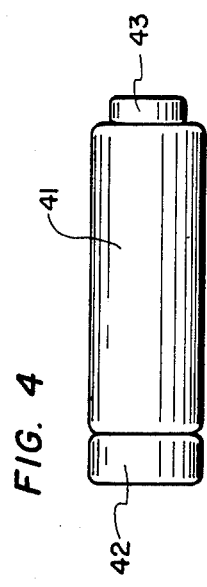
FIG. 4 shows an embodiment where the elements of system are arranged in coaxial fashion.

FIG. 4 shows a different embodiment of the invention wherein the various elements are all coaxial. This does not materially change the total volume required, but provides a significantly different form factor. The design of the FIG. 1 device is based on a diameter of more than twice its length (or thickness) while the FIG. 4 embodiment has a length more than twice its diameter. The objective lens 42 and the eyepiece 43 are comparable to elements 12 and 13 in FIG. 1 except that they are mounted on the axis of housing 41.

Figure 5:
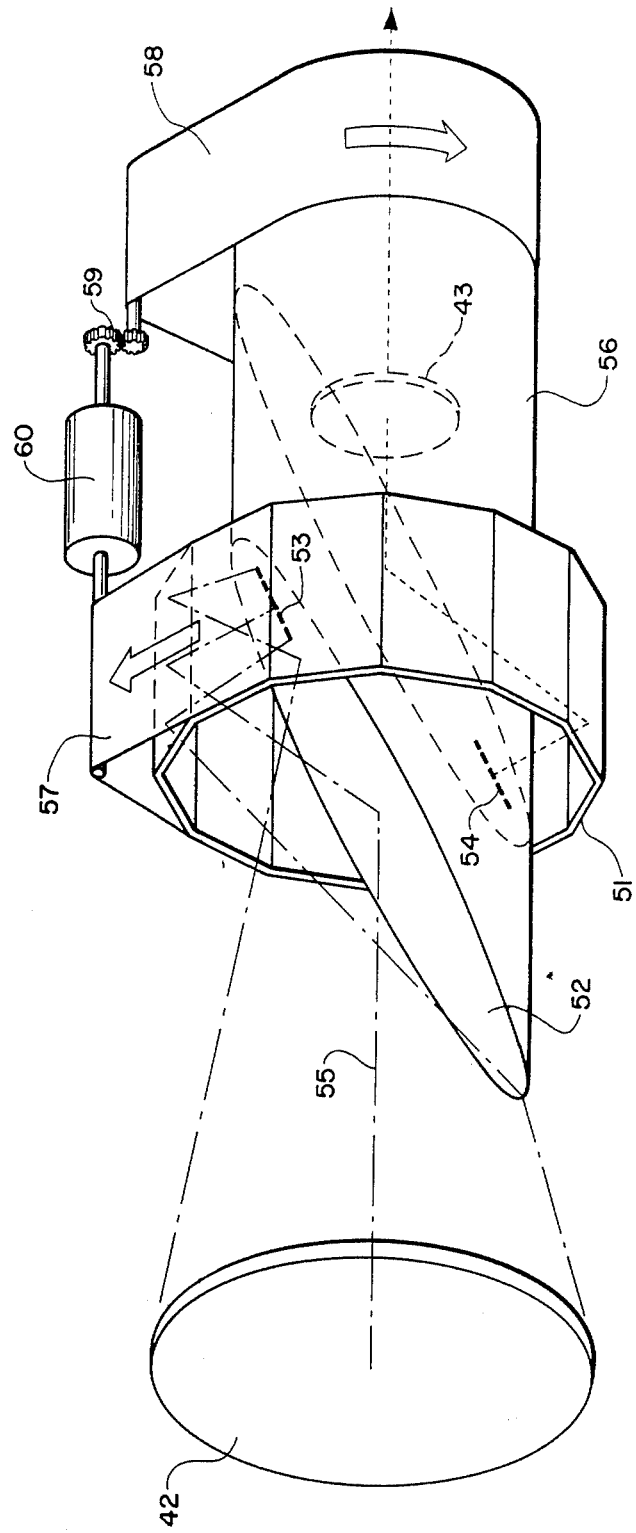
FIG. 5 shows an exploded view of the internal elements of FIG. 4.

FIG. 5 shows an exploded view of the internal elements of FIG. 4. The mirrors 51 are arranged in the same manner as mirrors 21 in FIG. 2. These mirrors may be mounted for rotation within the housing 21 or fixed thereto, depending on the mode of operation desired. Coaxially disposed and within mirrors 51 is a redirecting mirror 52. Both sides of the mirror are plane reflectors designed to reflect the wavelength associated with the nearest lens, e.g. far-infrared from objective 42 and visible for eyepiece 43. The mirror is inclined to the axis 55 by less than 45 degrees so radiation along the axis 55 will be reflected from it to mirror 51 and back striking the same surface nearer the edge at about the same angle of incidence as the axial reflection. The detector array 53 is mounted on this same surface of mirror 52 in the path on the twice reflected beam and centered about a plane intersecting the axis 55. The LED array 54 is placed in a diametrically opposed relationship on the opposite surface of the mirror. Radiation from this element will obviously be directed to the eyepiece according to the same ray geometry Relative rotation of the two mirror systems produce essentially the same scanning effect as in the FIG. 2 device. There will be keystoning and there may be rotation of the image at the detector, but these effects will be cancelled due to opposite effects produced by the LED. It does mean, however, that the maximum scan width must be slightly greater than might be expected. If mirror 52 is to rotate it can be mounted at the end of a hollow transparent or windowed tube 56, and the latter journalled in housing 41 in any convenient manner. The motor may be located near the wall of housing 41 and coupled to the tube 56 as by belt 58. Alternatively mirrors 51 may be edge driven with a belt 57 or ring gear, while mirror 52 is mounted in fixed or rotational relation to the housing. Both mirrors 51 and mirror 52 can be rotated at once, if reversing means such as gears 59 are provided. The necessary electronics to couple the detector and LEDs, a microchip, can be built into the mirror. DC power can be supplied from any external source using slip rings, if necessary, or batteries can be mounted in the housing or in tube 56.

A typical FIG. 5 device has the following parameters:

TABLE B

| | |
|---|---|
| f - (focal length of lens system) | 6 inches |
| F - (f/diam of lens opening) | 2 " |
| R - (spacing of scanning mirror from axis) | 1.5 " |
| r - (spacing of scanning mirror from detector) | 0.745 " |
| FOV - (Field of View) | 7 × 7 |
| - θ - (half angle of scan) | 20 |
| η - (angle of incidence with scan mirror centered) | 60 |
| α - (see copending application) | 0 |
| Number of Mirrors | 12 |
| Scan Rate (20 frames/sec) | 100 rpm |

Figure 6:
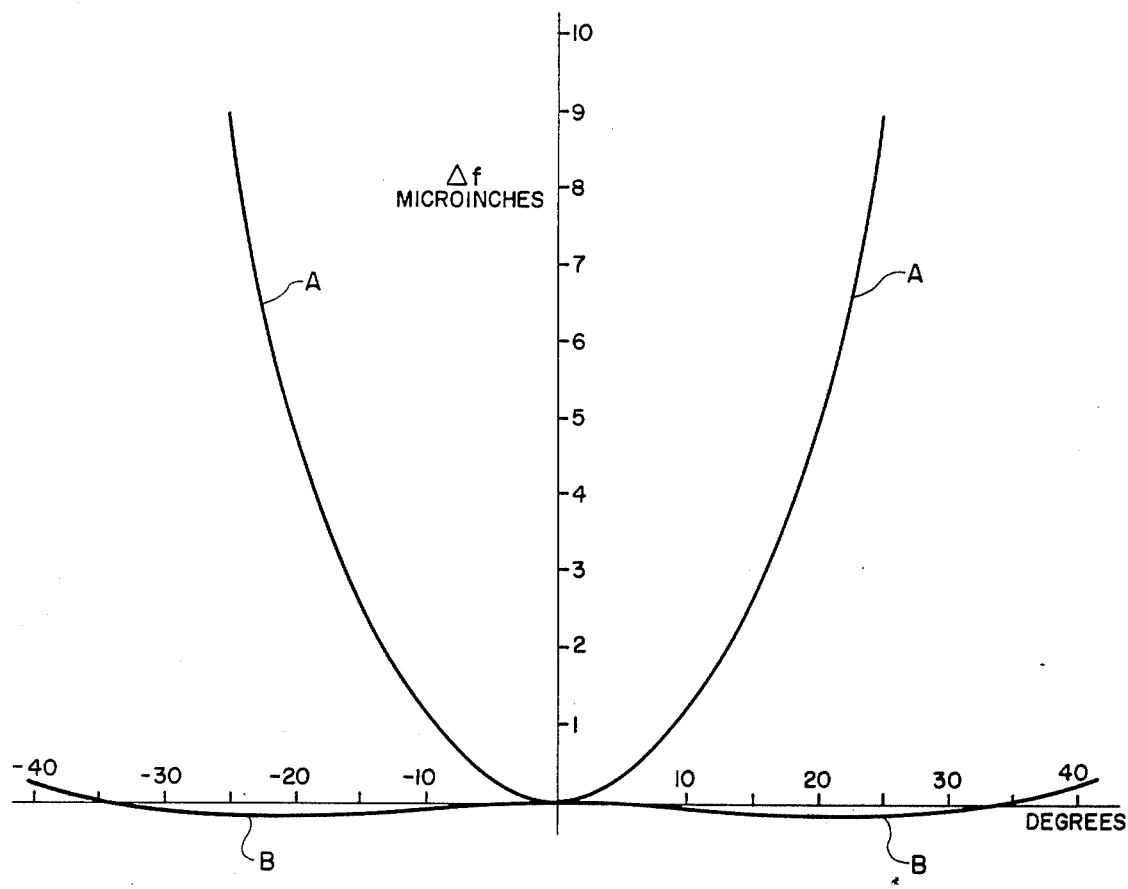
FIG. 6 shows a curve of the performance of the FIG. 4 device.

FIG. 6 shows the performance curves of the FIG. 5 device. Curves A and B have the same relationship as curves A and B in FIG. 3. The compensation is somewhat better than the FIG. 2 embodiment and no further correction is indicated Obvious many variations of the above structures will be immediately apparent to those skilled in the art but the invention is limited only by the claims which follow.

We claim:

1. An optical system comprising:

an objective lens means having a first optical axis for forming a convergent focused beam of light from a distant radiating object;

a first plane deflection mirror mounted at a first point on said first axis and inclined thereto to redirect said beam to a second point in a reference plane normal to said first optical axis;

a plurality of plane scanning mirrors symmetrically mounted in fixed relative positions at a fixed radial distance parallel to and facing a second axis, the center of one of said scanning mirrors coinciding with said second reference point;

a linear array of optical detectors mounted in fixed relative position to said objective lens and said first and second points with the centers of their active faces in a first radial plane through said second axis, the normal to the center of said array passing through said second reference point making an acute angle of at least several degrees with the straight line through said first and second points, said acute angle being approximately bisected by the normal from said second axis to said second point;

a third point located at the center of a second of said scanning mirrors;

an eyepiece lens having a third optical axis parallel to said first and second axis;

a second deflection mirror centered on said third axis and inclined thereto to reflect a light ray from said third point to said third axis;

a linear array of light emitting elements having their centers in a second radial plane through said second axis and having a central normal which passes through said third point, said light emitters being electronically coupled to said detector elements, with said lenses, deflection mirrors, and arrays being in fixed relative positions to one another and the spacing of said first and third axes from said second axis being equal and less than said fixed radial distance to said scanning mirrors; and means for rotating said scanning mirrors relative to said relatively fixed elements about said second axis.

2. A system according to claim 1 wherein said scanning mirrors each are inclined from perpendicular to the normal to said second axis through said second point by a small angle $\alpha$.

3. A system according to claim 1 wherein said first and third axes are spaced from said second axis.

4. A system according to claim 1 wherein said first and third axes are coaxial with said second axis.

5. A system according to claim 1 wherein said arrays are mounted on the reflecting surface of said deflection mirrors.

6. A system according to claim 5 wherein:
said deflection mirror has first and second opposed parallel reflecting surfaces; and
said arrays are mounted on different ones of said surfaces.

* * * * *